Jan. 26, 1971     L. M. BALLARD ET AL     3,558,407
PRE-FORMED CHARACTER APPLICATION TO BASE MATERIAL
Filed Nov. 28, 1967     4 Sheets-Sheet 1
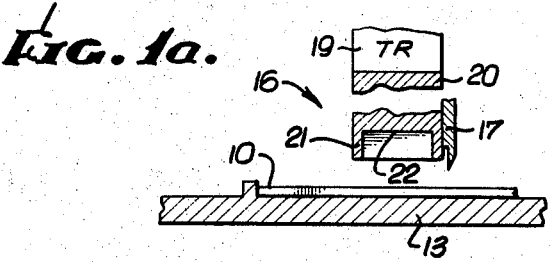
STATION A
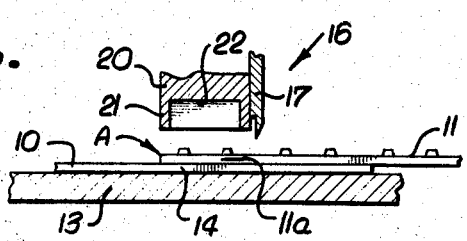
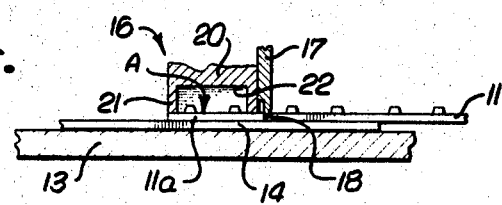
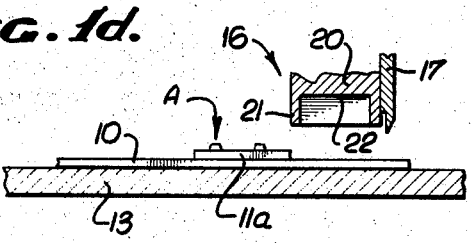
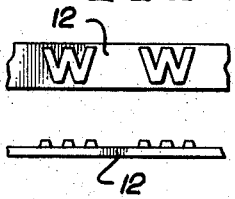
STATION W
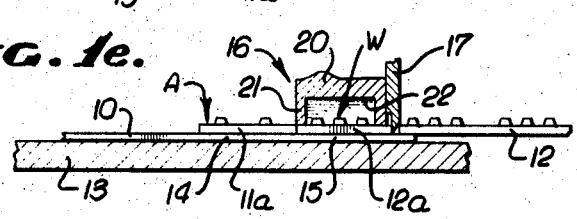
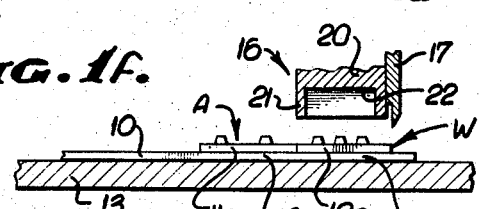
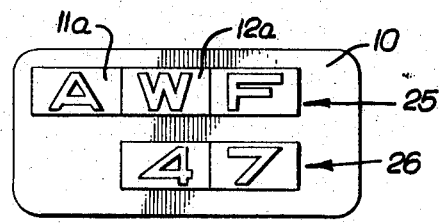
INVENTORS.
LOUIS M. BALLARD
ANDREW M. McINNIS
By White & Haefliger
ATTORNEYS Jan. 26, 1971 L. M. BALLARD ET AL 3,558,407
PRE-FORMED CHARACTER APPLICATION TO BASE MATERIAL
Filed Nov. 28, 1967 4 Sheets-Sheet 2
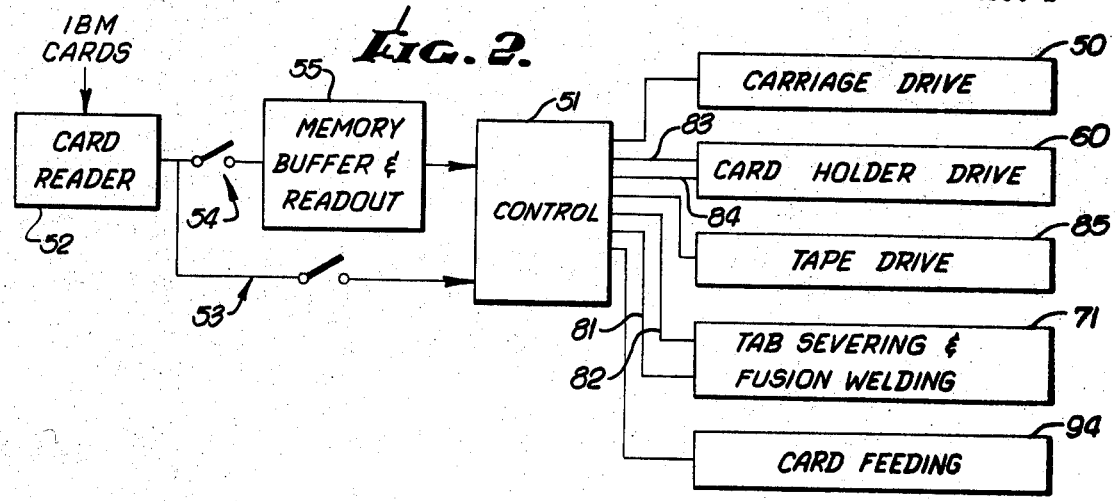
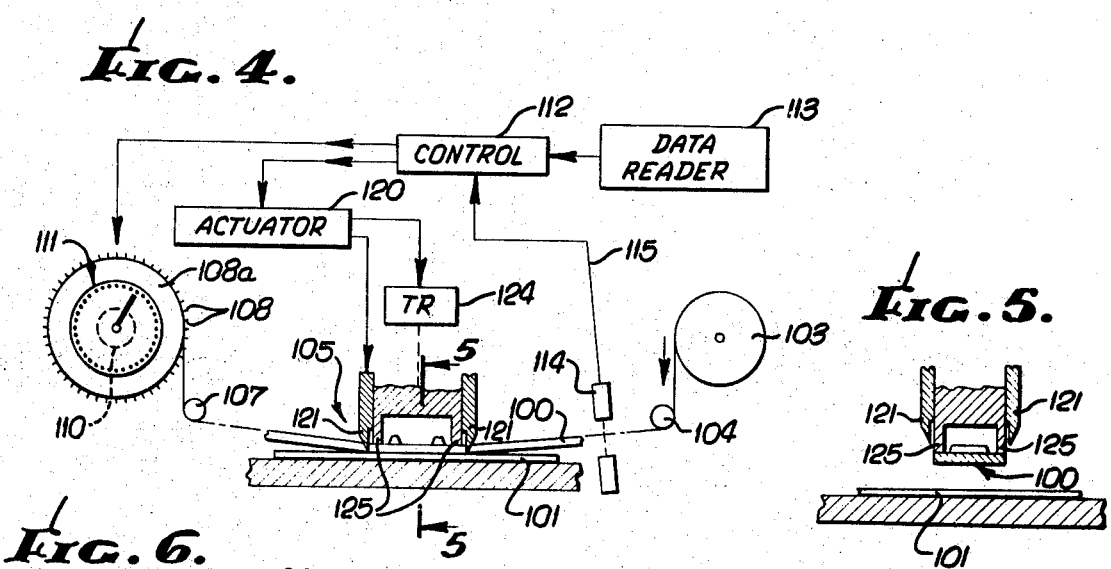
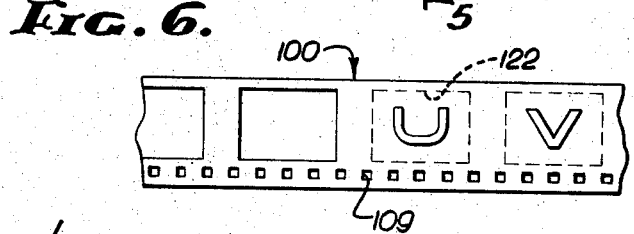
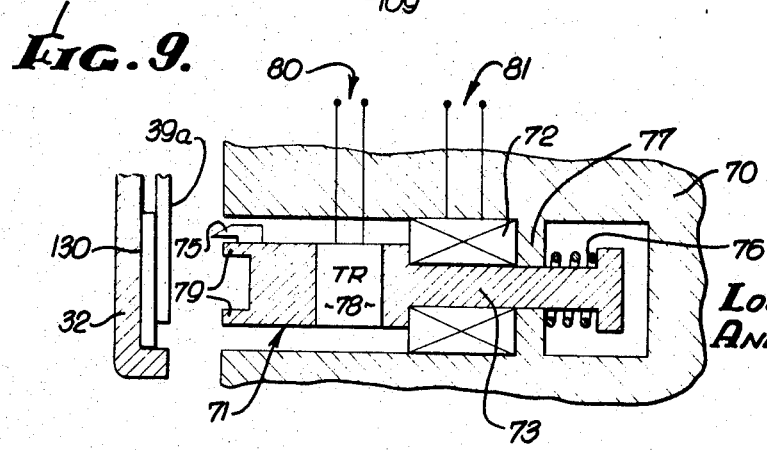
INVENTORS.
LOUIS M. BALLARD
ANDREW M. McINNIS
By White & Haefliger
ATTORNEYS.

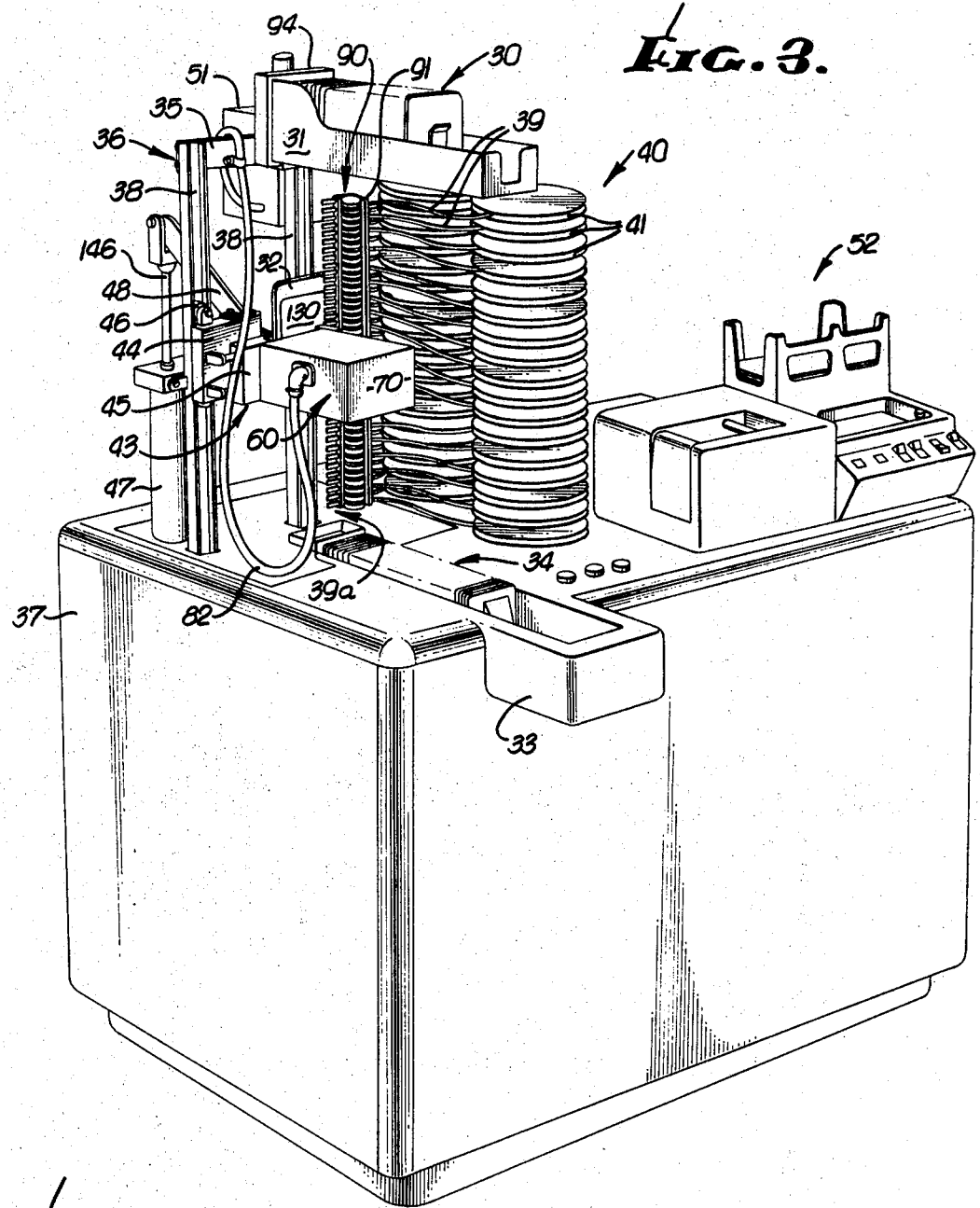
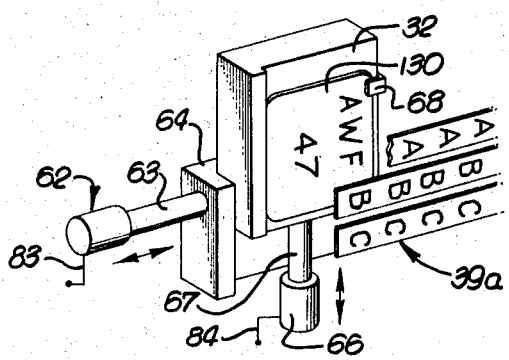

Jan. 26, 1971  L. M. BALLARD ET AL  3,558,407
PRE-FORMED CHARACTER APPLICATION TO BASE MATERIAL
Filed Nov. 28, 1967  4 Sheets-Sheet 4

INVENTORS.
LOUIS M. BALLARD
ANDREW M. MCINNIS
By White & Haefliger
ATTORNEYS.

United States Patent Office 3,558,407
Patented Jan. 26, 1971

3,558,407
PRE-FORMED CHARACTER APPLICATION TO BASE MATERIAL
Louis M. Ballard, Arcadia, and Andrew M. McInnis, Covina, Calif., assignors, by mesne assignments, to Rusco Industries, Inc., Los Angeles, Calif., a corporation of Delaware
Filed Nov. 28, 1967, Ser. No. 686,081
Int. Cl. B30b 15/06; B32b 31/18
U.S. Cl. 156—580      13 Claims

ABSTRACT OF THE DISCLOSURE

The disclosure concerns method and apparatus for forming solid embossed indica on sheets or cards, involving separation of selected embossments from a tape or tapes and adherence of such separated embossments to selected surface areas of the sheets or cards.

BACKGROUND OF THE INVENTION

This invention generally concerns the provision of embossements on sheets, and more particularly has to do with method and apparatus for providing solid alphanumeric embossments on data cards such as plastic credit cards.

Conventionally, credit cards are typically formed from extruded or calendered polyvinyl chloride plastic sheets varying in thickness from .018 inch to .030 inch. Certain areas of the sheets are printed, after which a thin film of a suitable plastic is placed on each side of the sheet and the assembly is placed in a laminating press wherein applied heat and pressure cause the film or films to become bonded to the sheet. Cards may thus be blanked out of the laminated assembly in a suitable punch press fitted with a blanking die.

The blanks are next embossed with letters and/or numbers, or other required information. Such embossment acts to provide raised faces or outlines of characters on a card acting as type when an imprinting roller is passed over the card causing the embossed character outline to be transferred to a document. Thereafter, the imprinted documents may be read by an optical character recognizing scanner which punches corresponding information into a tab card capable of being handled by computers.

During the imprinting process heavy pressure is exerted by a roller on the embossed characters causing them to deflect. Repeated deflection during use of the card eventually causes the characters to remain in a somewhat deflected condition, i.e., they do not return to the height which they had when originally formed. Due to this loss in embossed character height, documents imprinted from such cards tend to lose their black intensity, which varies from character to character because of character configuration. Continued loss of character intensity forming capacity of a card eventually results in inability of a document scanner to recognize the characters it is trying to read.

SUMMARY OF THE INVENTION

It is a major object of the invention to overcome the above problems through provision of unusually advantageous method and apparatus to form solid embossed indicia on sheets or cards, and in such manner that the indicia will not deflect appreciably even after lengthy use of the cards. Briefly, and in its method aspects, the invention involves the steps that include:

(a) providing tape means, such as one or more tapes, having indicia forming embossments spaced thereon lengthwise of the tape, (b) effecting relative movement of the tape means and sheet, or card, to successively position selected embossements adjacent selected surface areas of the sheet, and (c) effecting separation of the selected embossments from the tape and adherence of such separated embossments to the sheet at those selected surface areas.

Typically, the sheet and tape means may comprise thermoplastic material, and the adherence may be advantageously effected by interface contacting the sheet and embossment mounting tabs separated from the tape, the tabs being fusion welded to the sheet so as not to disturb the integrity of the embossments. Also, the tape means may comprise multiple tapes having different indicia forming embossments thereon, and with terminal portions arranged in a sequence, the sheet or card then being traveled sequentially along such terminal portions and to selected position relative to the latter. The embossment separation step may then be accomplished by severing the tabs from the tape terminal portions. Alternatively, the tape means may comprise a single tape having different indicia forming embossments thereon, such a tape being traveled across the sheet or card to locate a selected embossment in position for separation of an embossment mounting tab from the tape and adherence to the sheet, tape travel being interrupted when the selected embossment is in that position. In such case, the method may include the further step of sensing tape travel position for relating the location of the selected embossment to the separation position.

In its apparatus aspects, the invention includes the combination comprising:

(a) strip means (such one or more tapes) having indicia forming embossments spaced thereon,
(b) a sheet holder,
(c) actuator means for effecting relative movement of the strip means and holder to successively position selected embossments adjacent selected surface areas respectively of the sheet, and
(d) other means to effect separation of the selected embossment from the strip means and adherence of the separated embossments to the sheet at the selected areas.

Where the tape means comprises multiple tapes having terminal portions arranged in a sequence, the actuator means may typically include a carriage mounting the sheet or card holder to travel sequentially to selected positions relative to the tape terminal portions. In addition, the tape separating and adherence (as for example fusion welding) means may be located on the carriage, and the actuator means may include structure for moving the sheet or card holder relative to the carriage to locate a selected area of the sheet or card in position for adherence of an embossment thereto. Further, tape feeder means may be provided to advance that tape from which an embossment tab has been separated, the tapes being arranged in a vertical bank. Also, the actuator means and the tab separating and adhering means may be operated in response to operation of a data reader, as will be described, whereby a series of cards may be rapidly and automatically provided with embossments corresponding to data transmission via the reader.

In the alternative case where only one tape is utilized, the actuator means may typically include apparatus to interruptedly travel the tape across a sheet or card zone at the holder, tape travel interruption being controlled, as by a sensor, to occur when a selected embossment on the tape is brought into position for separation from the tape and adherence to the sheet or card at that zone. Also, selected embossments may be made separable from the tape on tabs mounting the embossments, the tab widths being smaller than the tape width.

These and other objects and advantages of the invention, as well as the details of an illustrative embodiment, will be more fully understood from the following detailed description of the drawings, in which:

BRIEF DESCRIPTION OF THE DRAWINGS

FIGS. 1a–1f are side elevations taken in section, showing relative movement of multiple tapes, a card, a card holder, and tab severing and adhering elements, illustrating a sequence of steps in accordance with the method of the invention;

FIGS. 1g, 1h and 1i are plan views of tape and card elements;

FIG. 2 is a block diagram illustrating electrical control for the system seen in FIG. 3;

FIG. 3 is a perspective overall illustration of apparatus employing multiple tapes for providing embossed indicia on a sheet or card;

FIG. 4 is a side elevation taken in section showing use of a single tape, card, card holder and tape severing and adhering elements, in accordance with the method of the invention;

FIG. 5 is a section taken on line 5—5 of FIG. 4;

FIG. 6 is a plan view of the single tape as used in FIG. 4;

FIG. 8 is a perspective view of structure for moving a card holder; and

FIG. 9 is a plan view section showing a tape cutter and fusion welder on a plunger.

DESCRIPTIONS OF PREFERRED EMBODIMENTS

Figure 7:
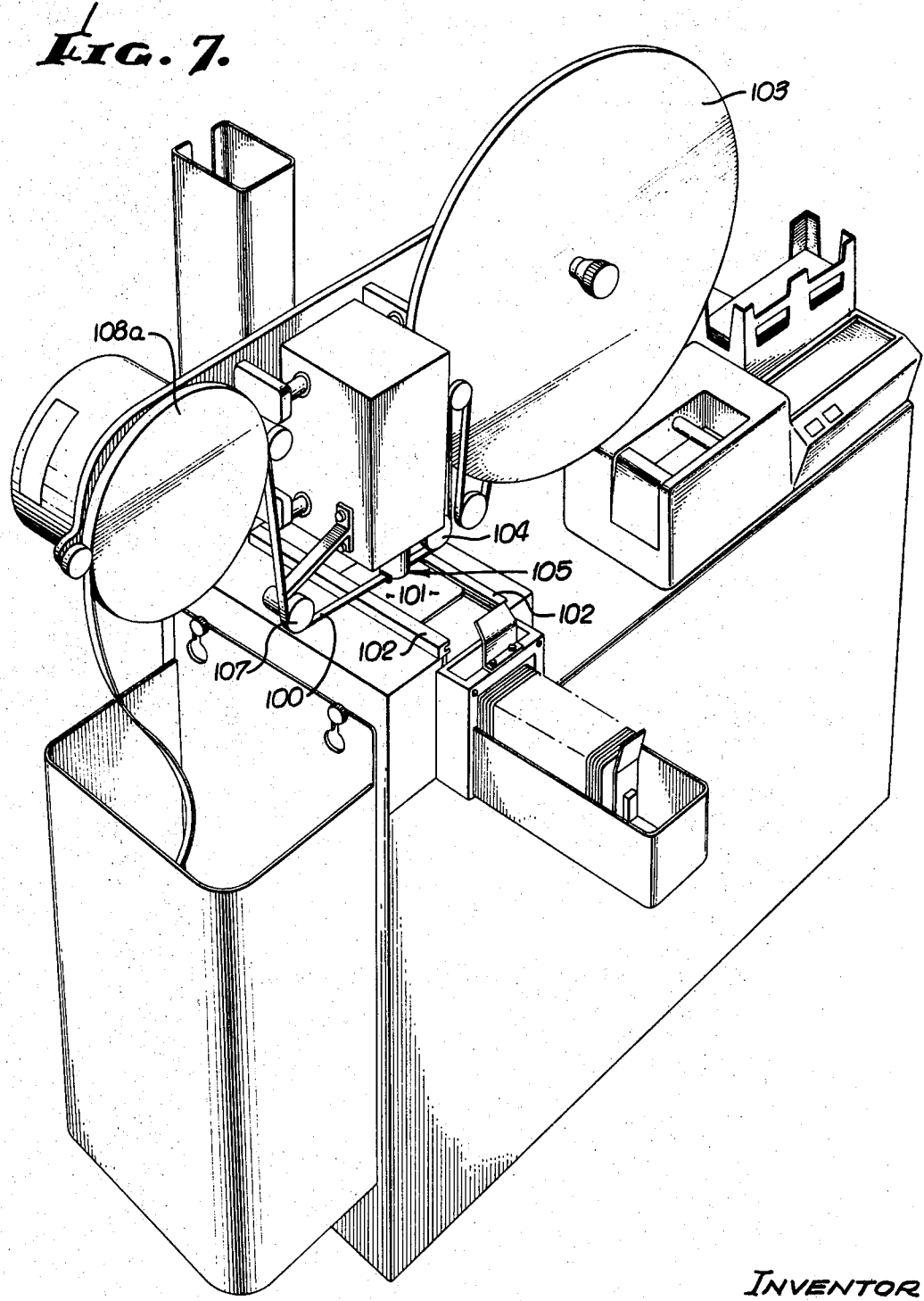
FIG. 7 is a perspective overall showing of apparatus employing a single tape for providing embossed indicia on a sheet or card.

FIGS. 1a–1f illustrate the manner in which two embossments may be provided on a base sheet or card 10, views 1a–1b being associated with provision of the first embossment on the sheet at a STATION A, and views 1d–1f being associated with provision of the second embossment on the sheet at a STATION W. In this regard, tapes 11 and 12 are respectively located at STATION A and STATION W, the first tape 11 mounting embossments of one type (say, for example, the letter A), and the second tape 12 mounting embossments of another type (say, for example, the letter W). Further, the embossments may be spaced along the tapes as seen in the auxiliary plan views 1g and 1h of the tapes 11 and 12. It should be mentioned that embossments on other tapes may include other letters, numbers and indicia.

The method of the invention includes the step of effecting relative movement of the tape means and sheet or card 10 to successively position selected embossments adjacent selected surface areas of the sheet. Note in this regard the relative movement of the tape 11 and card holder 13 from FIG. 1a position to FIG. 1b position to locate an embossment A in position adjacent card area 14. Similarly, note relative movement of the tape 12 and card holder from FIG. 1b, 1c and 1d position to FIG. 1e position to locate an embossment W in position adjacent card area 15. FIGS. 1c and 1e in this regard illustrate separation of the selected embossments from the tape and adherence of the separated embossments to the sheet at the selected areas 14 and 15.

More specifically, in FIG. 1a the card 10, attached to holder 13 is moved to the right, and tape 11 is moved to the left, to arrive at the positioning seen in FIG. 1b, with embossment mounting tab 11a on the tape directly beneath the head 16. The head is then lowered to cause the cutter 17 to sever the tab from the tape at 18, but without cutting the card. Further, the tab is fusion welded to the card as by transmission of ultrasonic energy from transducer 19 and via the head body 20 and terminals 21 to the tab periphery. Note that the embossment A is received in a recess 22 in the body so as not to transmit the vibrations. The latter act to melt local portions of the tab and card beneath terminals 21 for fusion welding, and for this purpose the tab and card may consist of thermoplastic material such as polyvinyl chloride.

Thereafter, the head 16 is raised, and the card holder and card are moved to STATION W associated with tape 12, where the tape 12 and card are relatively moved and head 16 lowered to sever tab 12a and to fusion weld it in position adjacent tab 11a, as shown. FIG. 1f shows the tab after raising of head 16 and FIG. 1i illustrates the card in plan view. Note the rows 25 and 26 of letters and numbers in FIG. 1i, consisting of embossments on tabs secured in position. Such embossments cannot deflect during imprinting, due to the manner in which they are secured in position and backed with solid plastic material. Finally, the steps as described may be performed by hand, although the apparatus to be described is unusually well adapted to high speed forming of individual cards.

FIG. 3 illustrates one unusually advantageous form of apparatus for providing embossed indicia on a sheet or sheets such as a sequence of plastic credit cards. Card blanks are supplied at 30 from upper receptacle 31 for transfer in sequence to a card holder 32. Following embossment the finished cards are downwardly transferred to a lower receptacle 33 for storage at 34. The upper receptacle may be mounted on crosspiece 35 of an upright frame 36 carried by the cabinet 37. The frame also includes channel shaped uprights 38.

Strip means such as multiple tapes 39 are carried on the cabinet, the tapes having indicia forming embossments thereon, each tube for example incorporating a sequence of like embossments different from the embossments on other tapes. The latter are supplied as by the bank 40 of supply reels 41. Further, the thermoplastic tapes have terminal portions 39a projecting laterally in parallel relation and arranged in vertical sequence.

The invention contemplates the provision of actuator means for effecting relative movement of the strip means (as for example tape terminals 39a) and the card holder 32 to successively position selected embossments on the tape terminals adjacent selected surface areas respectively of the sheet or card 130 carried by holder 32. One such actuator means includes a carriage 43 mounting the holder 32 to travel vertically sequentially along the tape terminal portions and to selected positions relative to the latter. Carriage 43 is shown to include components 44 and 45 carrying guide rollers (such as 46) received in the channels of the two uprights 38 for guiding vertical travel of the carriage. The actuator means also is illustrated to include a rod 146 projecting upwardly from a drive cylinder 47 for vertical movement and an arm 48 connecting the rod and carriage to move the latter vertically. Drive structure within the cylinder is operable to displace the rod vertically in incremental amounts equal to the vertical spacings of the tape terminal portions 39a, so that there is one and only one position of the rod and carriage corresponding to each tape terminal position. Such drive structure may for example include a precision vertical rack attached to rod 46 and a drive gear engaging the rack, the drive gear rotating by angular increments controllable by shaft encoding means for precise positioning of the rod.

FIG. 2 illustrates in block form carriage drive 50 electronically controlled at 51. The latter control may be responsive for example to the operation of an IBM card reader 52, also indicated in FIG. 3. The control 51 may be made directly responsive to card reader operation, as indicated by channel 53 in FIG. 2, or it may be made indirectly responsive. An example of the latter is the channel 54 in FIG. 2 comprising a memory buffer and readout system 55 enabling relatively rapid reading of the IBM cards, followed by relatively slower embossing of credit cards.

The actuator means as shown also includes structure for moving the card holder 32 (with the sheet thereon) relative to the carriage, as well as relative to other means indicated generally at 60, in order to locate a selected sheet or card 130 area in position for adherence of an embossment. One exemplification of such structure is shown in FIG. 8 to include a device 62 on carriage component 45 operable via rod 63 to move the carrier 64 horizontally. Carrier 64 carries the card holder 32 which is therefore moved horizontally relative to the tape terminals 39a. Similarly, if needed, a drive 66 may be provided on the carrier to operate via rod 67 to move the holder 32 vertically relative to the tape terminals, although normally vertical movement of the carriage is sufficient for vertical positioning of the card 130 relative to the tape terminals. Note that card 130 is removably attached to the holder, as for example by clip 68.

As mentioned above, the invention contemplates the provision of other or additional means to effect separation of the selected embossments from the tapes and adherence of the separated embossments to the sheet at selected areas. Such other means, indicated generally at 60, includes a housing 70 mounted on the carriage 43 so as to be movable therewith. Extending the description to FIG. 9, the housing 70 is shown to contain a punch 71 reciprocable in response to operation of a solenoid including coil 72 and rod 73 integral with the punch. The punch is shown in retracted position, with cutter 75 spaced from the tape terminal 39a adjacent the card 130. When advanced by the solenoid, the cutter 75 severs the tape to form the tab as described above, punch shoulder 76 then engaging the stop 77. Also, in advanced position the transmitter or transducer 78 is operable to transmit ultrasonic energy via the lands 79 to the tape tab that has been severed, in the manner described in connection with FIG. 1, whereby the tab is fusion welded to the card. Electrical energy is supplied via lines 80 and 81 in cable 82 from the control 51. Cable 82 may also contain electrical leads 83 and 84 extending to the operators 62 and 66.

Referring to the tape supply, the invention further contemplates the provision of tape drive or feeder means, indicated at 85 in FIG. 2. Such a feeder is typically operable by control 51 to advance that tape from which an embossment has been separated, and immediately following such separation and retraction of the plunger 71. Accordingly, the tape terminals with embossments thereon are always in position for severing and adherence to the card when the plunger is advanced, positioning of the tabs on the card being controlled as described above. Such tape feeder means may include the drive rollers 90 seen in FIG. 1 and around which the tapes are guided by shield 91. The rollers may be driven by suitable independently operable indexing prime movers. Finally, FIGS. 2 and 3 indicate card feeding means at 94 operable to feed cards in sequence to the holder 32. Cards may be dropped from the holder to receptacle 33 upon release of clip 68 secured by a suitable actuator.

Turning now to FIG. 7, the device there shown employs a single tape 100 having different indicia forming embossments thereon. The device includes apparatus to interruptedly travel the tape across a zone of sheet or card 101 carried on a holder represented by channels 102 into which the edges of the card are received. Extending the description to FIG. 4, such apparatus may include a supply reel indicated at 103 from which tape is fed and turned via guide roller 104 to pass under the head 105 and adjacent the card 101. Thereafter, the tape travels under guide roller 107 and onto a controllable drive reel or sprocket 108a having teeth 108 which engage the tape via holes 109 for metering tape travel in relation to the head. The sprocket 108a may have a drive 110 with shaft encoding indicated at 111 so that its angular travel may be precisely controlled from the control 112, as for example in accordance with data transmitted by IBM card reader 113.

Thus, the tape traveling toward the head may be scanned as by an electric eye or similar device 114 to determine what embossments are traveling past the eye, the latter having output fed at 115 to the control 112. If the control is instructed by the reader to select an A embossment, the tape will advance until the scanner 114 senses passage of an A embossment, at which time the control will cause the sprocket drive 110 to advance the tape until that embossment is directly beneath the head 105. Thereafter, the head 105 will be lowered by actuator 120 and cutter 121 will sever a tab from the tape, the tab rectangular outline being indicated at 122 in FIG. 6 as smaller in width than the tape width.

The operation of the head 105 to fusion weld the tab to the card is the same as described above, a transducer for creating ultrasonic energy being indicated at 124, and the head terminal to transmit that energy being seen at 125.

We claim:

1. In apparatus for providing embossed indicia on a sheet:
   strip means having indicia forming embossments spaced thereon,
   a sheet holder,
   actuator means for effecting relative movement of the strip means and holder to successively position selected embossments adjacent selected surface areas respectively of the sheet, said actuator means including apparatus to interruptedly travel the strip means across and generally parallel to a sheet zone at the holder, strip means travel interruption being controlled to occur when a selected embossment mounting tab is brought into position for separation from the strip means and adherence to the sheet at said zone,
   and other means to effect separation of selected embossment mounting tabs from the strip means and adherence of the separated tabs to the sheet at said selected areas.

2. Apparatus as defined in claim 1 wherein said strip means comprises multiple tapes having different indicia forming embossments thereon.

3. Apparatus as defined in claim 1 wherein said strip means comprises a single tape having different indicia forming embossments thereon.

4. Apparatus as defined in claim 1 wherein said strip means comprises at least one thermoplastic tape, said sheet also being thermoplastic, and said other means includes a transmitter located to direct ultrasonic wave energy to fusion weld the outer portions of the tabs and sheet.

5. Apparatus as defined in claim 2 wherein said tapes have terminal portions arranged in a sequence, and said actuator means includes a carriage mounting said holder to travel sequentially along said portions and to selected positions relative thereto.

6. Apparatus as defined in claim 5 wherein said other means is on the carriage and said actuator means also includes structure for moving said holder with the sheet thereon relative to the carriage and said other means to locate a selected sheet area in position for adherence of an embossment thereto.

7. Apparatus as defined in claim 5 wherein said sheet is in the form of a card, and including means to supply multiple cards in sequence to said holder and to receive cards from the holder.

8. Apparatus as defined in claim 7 including a frame mounting the carriage to travel generally vertically, the tape terminal portions being arranged in generally vertical succession, and including a bank of supply reels for said tapes.

9. Apparatus as defined in claim 8 including tape feeder means operable to advance that tape from which an embossment has been separated and after said separation.

10. Apparatus as defined in claim 1 including a data reader, and means responsive to operation of said reader to control said actuator means and said other means.

11. Apparatus as defined in claim 1 wherein said strip means includes at least one tape from which selected embossments are separable on tabs mounting the embossments, and said last named means includes a cutter operable to sever said tabs from the tape, and a fusion welder operable to effect adherence of said tabs to said sheet.

12. Apparatus as defined in claim 3 wherein selected embossments are separable from the tape on tabs mounting the embossments, the widths of said tabs being smaller than the tape width.

13. Apparatus as defined in claim 3 including a sensor operable to sense tape travel position for relating the location of a selected embossment of said separation position.

References Cited
UNITED STATES PATENTS

| | | | |
|---|---|---|---|
| 1,762,539 | 6/1930 | Adams | 156—520X |
| 2,853,940 | 9/1958 | Wockenfuss et al. | 101—109X |
| 3,451,869 | 6/1969 | Nydegger | 156—73 |

BENJAMIN A. BORCHELT, Primary Examiner

J. J. DEVITT, Assistant Examiner

U.S. Cl. X.R.

156—73